3,028,253
OPTICAL BRIGHTENING OF ACRYLONITRILE
FIBRES
Reinhard Zweidler, Basel, Switzerland, assignor to J. R. Geigy A.-G., Basel, Switzerland, a Swiss firm
No Drawing. Filed Mar. 30, 1959, Ser. No. 802,599
Claims priority, application Switzerland Apr. 25, 1958
6 Claims. (Cl. 117—33.5)

The invention concerns a process for the optical brightening of acrylonitrile organic synthetic fibres and, as industrial product, the material the appearance of which has been improved by this process.

It has been found that the appearance of synthetic fibres which consist wholly or chiefly of polymeric or copolymeric acrylonitrile can be greatly improved by an aqueous treatment with solutions of salts of basic 4-(4.5-arylo-1.2.3-triazolyl-2)-stilbene sulphonic acid amides with acids. The brightening agents according to the invention correspond to the general formula I.

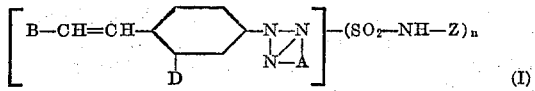

In this formula

A represents an arylo radical of the benzene, naphthalene or acenaphthene series bound at vicinal aromatic carbon atoms with the nitrogen atoms of the triazole ring,
B represents a radical of the benzene series,
Z represents the radical of a strong organic nitrogen base,
D represents a negative substituent not producing colour, including the group —SO₂—NH—Z, and
n represents a low whole number not greater than 4.

In this formula, the aromatic rings can be further substituted non-ionogenically except by substituents producing colour. Neither anion-forming substituents such as the carboxyl, sulphonic acid or aromatically bound hydroxyl groups for cation-forming amino groups and organically substituted amino groups should be present. Also chromophores such as nitro or arylazo groups and auxochromic hydroxyl and amino groups should not be present. On the other hand, the aromatic rings can be substituted, for example, by halogen, alkyl, alkoxy, alkyl sulphonyl, aryl sulphonyl groups and the arylo radical A can be substituted by acylamino groups. Also, the substitution of the benzene ring B in the o- and in the p-positions with regard to the vinylene group by strongly positivising groups imparting colour, in particular, by alkoxy groups, is excluded. But one single alkoxy group can be present in any position desired in the benzene ring B or also B can contain two alkoxy groups provided that only one of them does not occupy one of the critical o- or p-positions.

Chiefly the Z—NH—SO₂ group and then, for example, alkyl, aralkyl, aryl sulphonyl groups, sulphonic acid aryl ester groups or tertiary sulphonic acid amide groups as well as the cyano group can be the negative substituent D. If D is not the Z—NH—SO₂ group, this substituent can be linked either to B or, advantageously, to A; if the Z—NH—SO₂ group is used more than once as substituent, it can be advantageously in D and B, in D and A or in D, A and B. The group Z is derived advantageously from a strong aliphatic nitrogen base or from nitrogen bases containing or forming saturated rings. The basic nitrogen atom can be found to the sulphamide nitrogen atom advantageously by means of a saturated organic radical, in particular, by means of an alkylene group. Z however, can not only be derived from saturated ring nitrogen bases such as piperidine, piperazine or morpholine, but also, possibly, from pyridine bases. Advantageously Z represents a secondary, tertiary or quaternary aminoalkyl group, for example a mono- or di-alkylamino ethyl or propyl group having N-alkyl substituents of from 1 to 6 carbon atoms. It can also be a mono- or di-cyclohexylamino ethyl or propyl group, a piperidino-n-ethyl or -propyl group or a morpholino-N-ethyl or -propyl group. Z can also be a 2-dialkylamino ethoxyalkyl-, a 2-dialkylamino-1-cyclohexyl- or a dialkylaminoalkylaminoalkyl group. Also the ammonium bases obtained from these groups by alkylation with esters of low alcohols with strong inorganic or organic acids can be used as substituents.

A preferred group of brightening agents according to the invention are salts, the cation of which corresponds to the general formula

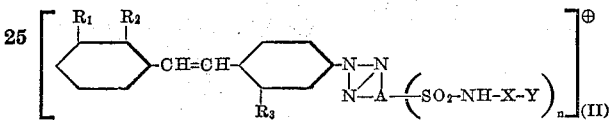

wherein

A represents an aromatic radical selected from the group consisting of the benzene, naphthalene and acenaphthene series in which two vicinal carbon atoms are bound to the nitrogen atoms of the triazole ring,
X represents a saturated hydrocarbon radical,
Y represents a nitrogenous base radical selected from the group consisting of monoalkylamino, monocyclohexylamino, dialkylamino, trialkylamino, piperidino and morpholino radicals, the alkyls being of not more than six C atoms each,
n represents the numerals 0 and 1,
R₃ represents a member selected from the group consisting of alkyl sulphone, aryl sulphone, CN, and—in the case where n is zero—the —SO₂—NH—X—Y group,
R₁ and R₂ each represent a member selected from the group consisting of hydrogen and lower alkoxy radicals, the aromatic nuclei being free from chromophores, auxochromes and ionogenic substituents.

Of technical interest because of their easy accessibility and their particularly favourable fluorescence, are those compounds of the general Formula II in which the arylo radical A is a naphthalene radical bound in the 1- and 2-positions or an acenaphthene radical bound in the 4- and 5-positions and R₃ is the SO₂—NH—X—Y— group wherein X represents a low molecular alkylene radical and Y is a dialkylamino group.

The 4-(4.5-arylo-1.2.3-triazolyl-2)-stilbene sulphonic acid amides used according to the invention are obtained most easily from the known corresponding sulphonic acids by converting the sulphonic acid group into the sulphonic acid chloride group with phosphorus oxychloride in inert organic solvents such as chlorobenzene. The sulphonic acid chloride obtained is condensed with a strong aliphatic nitrogen base which contains in addition to a primary amino group a further amino group, advantageously a secondary or tertiary amino group. The condensation is performed advantageously in the presence of excess nitrogen base and in an inert organic solvent or diluent. The condensation products are in the form of weakly yellowish to pale yellow coloured powders and they dissolve in organic solvents with an intensive blue-violet to green-blue fluorescence.

For the treatment of polyacrylonitrile fibres according to the invention, the basic 4-(4.5-arylo-1.2.3-triazolyl-2)-stilbene sulphonic acid amides are used in the form of salts of inorganic or organic acids. Chiefly, hydrochloric acid, sulphuric acid, and phosphoric acid are used as inorganic acids and chiefly formic acid, acetic acid, lactic acid, p-toluene sulphonic acid or tetrahydronaphthalene sulphonic acid are used as organic acids. The most simple procedure is to dissolve these basic stilbyl triazole compounds in strongly diluted aqueous acid, and enter the polyacrylonitrile material which can be in the form of threads, yarn or textiles, into the bath which, advantageously, has been previously warmed, to bring the liquor to the boil and keep it for a short time at boiling temperature.

After being wrung out, rinsed and dried, the polyacrylonitrile material has a much more white appearance in daylight than before treatment. The white shadings have very good fastness to light and also good washing fastness. Only slight amounts of the stilbene compounds according to the invention are necessary to attain a clearly visible brightening effect on polyacrylonitrile fibres. Even amounts of 0.025 to 0.1%, calculated on the weight of the fibres, are sufficient. Also remarkable is the fact that these stilbene compounds have very good fastness to chlorine. This is a very valuable property as often ray polyacrylonitrile fibres are bleached with agents giving off chlorine and the excess chlorine can only seldom be completely removed from the material.

The fact that synthetic materials of polymeric or copolymeric acrylonitrile can be given a more white appearance by incorporation of triazolyl stilbene compounds is already known. Depending on the use to which these synthetic materials are to be put however, a white shading performed at the beginning can possibly become completely useless, and, depending on the type of working up process, it can be injured or even completely removed. The new process enables polyacrylonitrile to be treated at any stage of textile processing and is, thus, a valuable contribution to the art.

Further details can be seen from the following examples which do not limit the invention in any way. In these examples parts are given as parts by weight and the temperatures are in degrees centigrade. The relationship of parts by weight to parts by volume is as that of kilogrammes to litres.

EXAMPLE 1

20 parts of polyacrylonitrile yarn ("Orlon," type 42 of Du Pont, Wilmington, Delaware, U.S.A.) are introduced into a liquor at 50° which contains 0.005 part of the compound of the formula

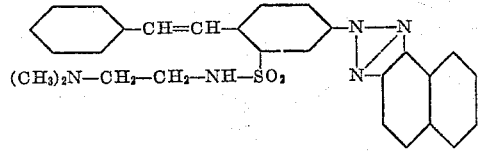

and 1 part of formic acid in 600 parts of water.

The temperature is raised to 97–100° within 15 minutes and the liquor is kept at this temperature for 30 minutes. The yarn is rinsed first with lukewarm and then with cold water and dried. In daylight, the material so treated has a beautiful white shading.

A considerably more strong white shading is obtained if in the above example, 0.02 part of the compound named is used instead of 0.005 part.

The compound named is obtained by reacting 2-(stilbyl-4'')(naphtho-1'.2':4.5)-1.2.3-triazole-2''-sulphonic acid chloride with an excess of N.N-dimethyl ethylene diamine in chlorobenzene. It is a pale yellow powder which melts at 147–151° uncorrected.

Similar brightening effects are obtained if in the above example, the formic acid is replaced by 2.4 parts of concentrated hydrochloric acid or by 0.6 part of concentrated sulphuric acid.

EXAMPLE 2

20 parts of polyacrylonitrile yarn ("Orlon" type 42 of Du Pont, Wilmington, Delaware, U.S.A.) are introduced into a liquor at 50° which contains 0.01 part of the compound

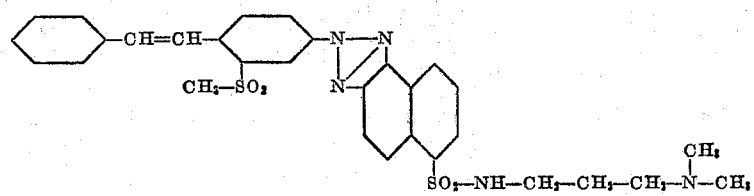

and 3 parts of concentrated hydrochloric acid in 600 parts of water. The temperature is raised within 15 minutes to 97–100° and the liquor is kept for 30 minutes at this temperature. The yarn is then rinsed with lukewarm and then cold water and dried. The material so treated has a beautiful white shading in daylight.

The triazolyl stilbene compound is obtained from the corresponding known sulphonic acid by converting the acid with phosphorus oxychloride in chlorobenzene into the corresponding sulphonic acid chloride and reacting with excess N-dimethyl ethylene diamine in chlorobenzene. It is a yellowish powder. M.P. 141–144° uncorrected.

Similar brightening effects are obtained under the same conditions with analogues which contain the sulphonic acid amide group in other positions of the naphthalene ring such as are described in Tables IV and V.

EXAMPLE 3

20 parts of polyacrylonitrile ("Orlon," type 42 of Du

Pont, Wilmington, Delaware, U.S.A.) are entered into a liquor at 56° which contains 0.01 part of the compound

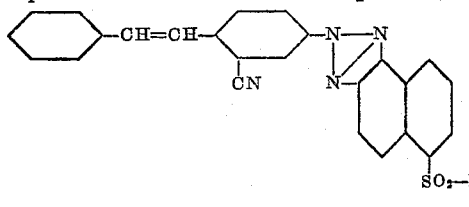

and 0.8 part of concentrated sulphuric acid in 600 parts of water. The temperature is raised to 97–100° within 15 minutes and the liquor is kept for 30 minutes at this temperature. The yarn is first rinsed with lukewarm and then with cold water and dried. In daylight the material so treated has a beautiful white shading.

The triazole compound used is obtained from the known corresponding sulphonic acid by reaction with phosphorus oxychloride in chlorobenzene and condensation of the sulphonic acid chloride obtained with excess N-dimethyl ethylene diamine. It is a pale yellow powder which melts at 224–226° uncorrected.

Similar brightening effects are obtained with analogous compounds which contain the sulphonic acid amide group in other positions of the naphthalene ring, such as are described in Table VI.

EXAMPLE 4

20 parts of polyacrylonitrile yarn ("Orlon" type 42 of Du Pont Wilmington, Delaware, U.S.A.) are entered into a liquor at 50° which contains 0.006 part of the compound

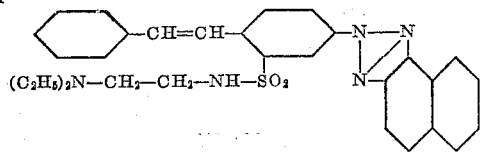

and 1 part of formic acid in 800 parts of water. The temperature is raised to 97–100° within 15 minutes and the liquor is kept for 30 minutes at this temperature. The yarn is first rinsed with lukewarm and then with cold water and dried. The material so treated has a beautiful white shading in daylight.

A considerably more strong white shading is obtained if in the above example 0.02 part of the named compound is used instead of 0.006 part.

The compound named is obtained by reacting 2-(stilbyl-4")(naphtho-1'.2':4.5)-1.2.3-triazole - 2" - sulphonic acid chloride with N.N-diethyl ethylene diamine. It is a pale yellow powder which melts at 173–174° uncorrected.

EXAMPLE 5

20 parts of polyacrylonitrile yarn ("Orlon" type 42 of Du Pont, Wilmington, Delaware, U.S.A.) are entered at 50° into a liquor which contains 0.005 part of the compound of the formula

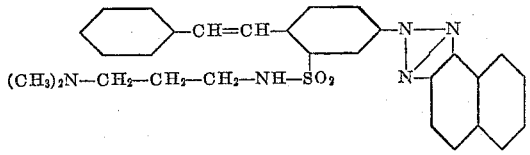

and 1 part of formic acid in 800 parts of water. The temperature is raised to 97–100° within 15 minutes and the liquor is kept at this temperature for 30 minutes. The yarn is then rinsed first with lukewarm and then with cold water and dried. The material so treated has a beautiful white shading in daylight.

A considerably more strong white shading is obtained if in the above example 0.02 part of the compound named is used instead of 0.005 part.

The compound named is obtained by reacting 2-(stilbyl-4")(naphtho-1'.2':4.5)-1.2.3-triazole - 2" - sulphonic acid chloride with 3-(dimethylamino)-propylamine. It is a pale yellow powder which melts at 140–143° uncorrected.

Similar brightening effects are obtained if in the above example the formic acid is replaced by 2.4 parts of concentrated hydrochloric acid or by 0.6 part of concentrated sulphuric acid.

If about the same amounts of the compounds formulated in the following tables are used instead of the substances named in these examples and otherwise the same procedure is followed, then similar effects are obtained on polyacrylonitrile fibres.

Table I

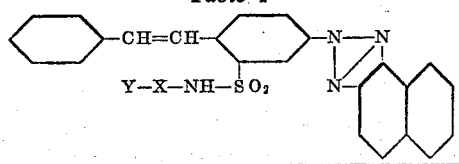

| X | Y | Appearance of powder | M.P. uncorrected, degrees |
|---|---|---|---|
| —(CH$_2$)$_2$— | —NH—C$_2$H$_5$ | pale yellow | 235–237. |
| —(CH$_2$)$_2$— | —NH—C$_3$H$_7$ | yellowish | 182–184. |
| —(CH$_2$)$_2$— | —NH—C$_4$H$_9$ | yellow | 187–189. |
| —(CH$_2$)$_2$— | —N(C$_4$H$_9$)$_2$ | do | 123–125. |
| —(CH$_2$)$_3$— | —NH—C$_2$H$_5$ | yellowish | 149–151. |
| —(CH$_2$)$_3$— | —N(C$_2$H$_5$)$_2$ | pale yellow | 108–110. |
| —(CH$_2$)$_3$— | —NH—⟨C$_6$H$_5$⟩ | do | 180–183. |
| —(CH$_2$)$_2$— | —N(CH$_2$CH$_2$)$_2$O (morpholino) | do | 196–197. |
| —(CH$_2$)$_2$— | —N(CH$_2$CH$_2$)$_2$CH$_2$ (piperidino) | do | 172–174. |
| ⟨C$_6$H$_5$⟩ | —NH—⟨C$_6$H$_5$⟩ | do | 206–208. |
| —(CH$_2$)$_2$— | ⊕—N(CH$_3$)$_3$  —½ SO$_4$ | do | decomposition over 300. |
| —(CH$_2$)$_3$— | ⊕—N(CH$_3$)$_3$  —½ SO$_4$ | do | Do. |
| —(CH$_2$)$_3$— | ⊕—N(C$_2$H$_5$)$_2$ \| CH$_3$  —½ SO$_4$ | do | Do. |

Table II

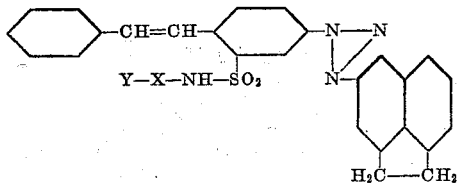

| X | Y | Appearance of powder | M.P. uncorrected, degrees |
|---|---|---|---|
| —(CH$_2$)$_2$— | —N(CH$_3$)$_2$ | pale yellow | 189–191 |
| —(CH$_2$)$_2$— | —N(C$_2$H$_5$)$_2$ | yellowish | 206–210 |
| —(CH$_2$)$_3$— | —N(CH$_3$)$_2$ | do | 187–188 |
| ⟨C$_6$H$_5$⟩ | —NH—CH$_3$ | yellow | 188–191 |

Table III

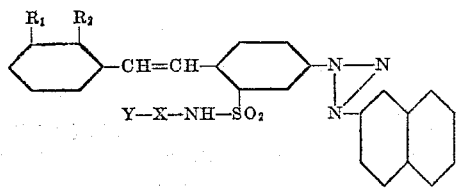

| X | Y | R₁ | R₂ | Appearance of powder | M.P. uncorrected, degrees |
|---|---|---|---|---|---|
| $-(CH_2)_2-$ | $-N(CH_3)_2$ | $-O-CH_3$ | $-H$ | pale yellow | 149–151 |
| $-(CH_2)_2-$ | $-NH-\langle H \rangle$ | $-O-CH_3$ | $-H$ | yellowish | 165–167 |
| $-(CH_2)_2-$ | $-N\begin{smallmatrix}CH_2-CH_2\\CH_2-CH_2\end{smallmatrix}O$ | $-O-CH_3$ | $-H$ | yellowish | 190–193 |
| $-(CH_2)_2-$ | $-N(CH_3)_2$ | $-O-CH_3$ | $-O-CH_3$ | pale yellow | 162–1 |
| $-(CH_2)_2-$ | $-N\begin{smallmatrix}CH_2-CH_2\\CH_2-CH_2\end{smallmatrix}O$ | $-O-CH_3$ | $-O-CH_3$ | pale yellow | 182–184 |

Table IV

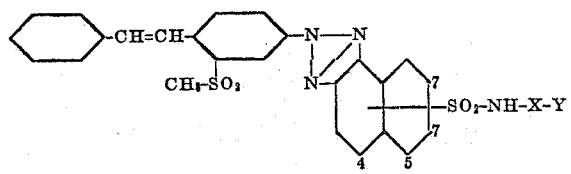

| Position | X | Y | Appearance of powder | M.P. uncorrected, degrees |
|---|---|---|---|---|
| 4 | $-(CH_2)_2-$ | $-N(CH_3)_2$ | yellowish | 132–135 |
| 5 | $-(CH_2)_2-$ | $-N(CH_3)_2$ | beige | 144–147 |
| 6 | $-(CH_2)_2-$ | $-N(CH_3)_2$ | do | 214–216 |
| 7 | $-(CH_2)_2-$ | $-N(CH_3)_2$ | brownish-yellow | 207–210 |
| 4 | $-(CH_2)_3-$ | $-N(CH_3)_2$ | yellow | 142–145 |
| 5 | $-(CH_2)_3-$ | $-N(CH_3)_2$ | yellowish | 212–215 |
| 6 | $-(CH_2)_3-$ | $-N(CH_3)_2$ | beige | 217–220 |

Table VI

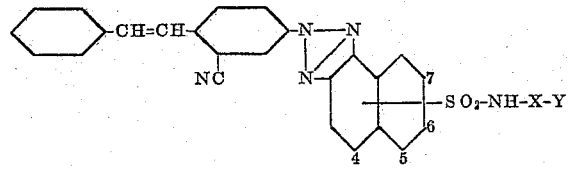

| Position | X | Y | Appearance of powder | M.P. uncorrected, degrees |
|---|---|---|---|---|
| 4 | $-(CH_2)_2-$ | $-N(CH_3)_2$ | yellowish | 209–211 |
| 6 | $-(CH_2)_2-$ | $-N(CH_3)_2$ | yellow | 212–214 |
| 7 | $-(CH_2)_2-$ | $-N(CH_3)_2$ | pale beige | 139–141 |
| 4 | $-(CH_2)_3-$ | $-N(CH_3)_2$ | pale yellow | 174–176 |
| 5 | $-(CH_2)_3-$ | $-N(CH_3)_2$ | do | 224–225 |
| 6 | $-(CH_2)_3-$ | $-N(CH_3)_2$ | do | 181–183 |
| 7 | $-(CH_2)_3-$ | $-N(CH_3)_2$ | yellow | 197–198 |

Table V

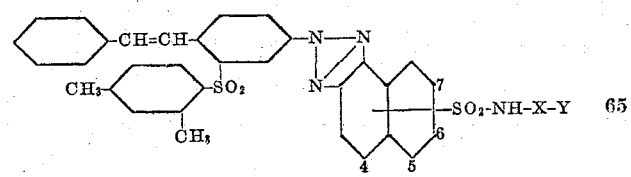

| Position | X | Y | Appearance of powder | M.P. uncorrected, degrees |
|---|---|---|---|---|
| 4 | $-(CH_2)_3-$ | $-N(CH_3)_2$ | beige | 142–145 |
| 5 | $-(CH_2)_3-$ | $-N(CH_3)_2$ | do | 155–158 |

Table VII

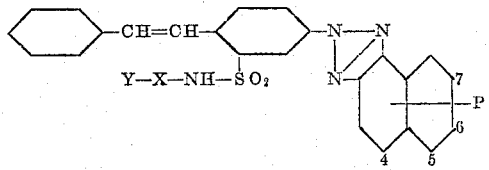

| Position | Z | X | Y | Appearance of powder | M.P. uncorrected, degrees |
|---|---|---|---|---|---|
| 4 | Cl | $-(CH_2)_2-$ | $-N(CH_3)_2$ | beige | 173–175 |
| 7 | $O-CH_3$ | $-(CH_2)_2-$ | $-N(CH_3)_2$ | yellow | 156–158 |
| 4 | $CH_3$ | $-(CH_2)_2-$ | $-N(CH_3)_2$ | pale yellow | 183–185 |
| 4 | Cl | $-(CH_2)_3-$ | $-N(CH_3)_2$ | yellowish | 161–162 |
| 7 | $O-CH_3$ | $-(CH_2)_3-$ | $-N(CH_3)_2$ | do | 114–115 |
| 4 | $CH_3$ | $-(CH_2)_3-$ | $-N(CH_3)_2$ | pale yellow | 156–157 |

Table VIII

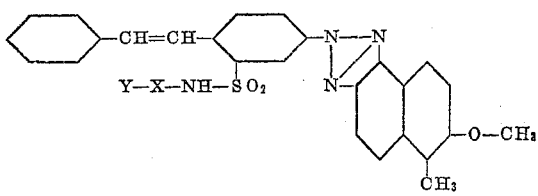

| X | Y | Appearance of powder | M.P. uncorrected, degrees |
|---|---|---|---|
| —$(CH_2)_2$— | —$N(CH_3)_2$ | pale yellow | 185–187 |
| —$(CH_2)_2$— | —$N(C_2H_5)_2$ | do | 192–195 |

Table IX

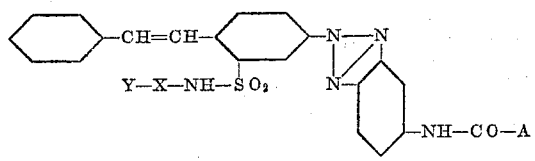

| A | X | Y | Appearance of powder | M.P. uncorrected, degrees |
|---|---|---|---|---|
| —$CH_3$ | —$(CH_2)_2$— | —$N(CH_3)_2$ | yellow | 156–159 |
| —⟨phenyl⟩ | —$(CH_2)_2$— | —$N(CH_3)_2$ | do | 159–162 |
| —$CH_3$ | —$(CH_2)_3$— | —$N(CH_3)_2$ | do | 229–232 |
| —⟨phenyl⟩ | —$(CH_2)_3$— | —$N(CH_3)_2$ | do | 235–238 |

What I claim is:

1. The method of optically brightening polymeric and copolymeric synthetic fibres consisting chiefly of polyacrylonitrile, which comprises treating said fibres in an aqueous solution containing a salt, the cation of which corresponds to the general formula

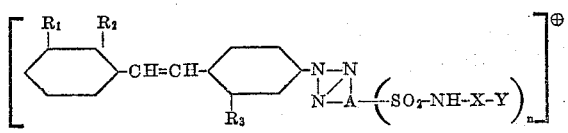

wherein A represents aromatic radicals selected from the group consisting of the benzene, naphthalene and acenaphthene series in which two vicinal carbon atoms are bound to the nitrogen atoms of the triazole ring,
X represents a saturated hydrocarbon radical,
Y represents a nitrogenous base radical selected from the group consisting of monoalkylamino, monocyclohexylamino, dialkylamino, trialkylamino, piperidino and morpholino radicals, the alkyls being of not more than six C atoms each,
n represents the numerals 0 and 1.
$R_3$ represents a member selected from the group consisting of alkyl sulphone, aryl sulphone, CN, and—in the case where n is zero—the —$SO_2$—NH—X—Y group,
$R_1$ and $R_2$ each represent a member selected from the group consisting of hydrogen and lower alkoxy radicals, all the aromatic nuclei being free from chromophores, auxochromes and further ionogenic substituents.

2. The method of optically brightening polymeric and copolymeric synthetic fibres consisting chiefly of polyacrylonitrile, which comprises treating said fibres in an aqueous solution containing a salt, the cation of which corresponds to the formula

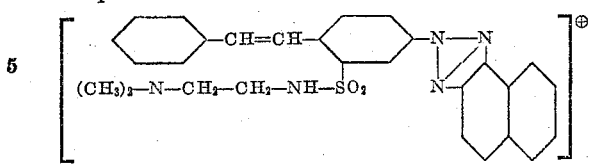

3. The method of optically brightening polymeric and copolymeric synthetic fibres consisting chiefly of polyacrylonitrile, which comprises treating said fibres in an aqueous solution containing a salt, the cation of which corresponds to the formula

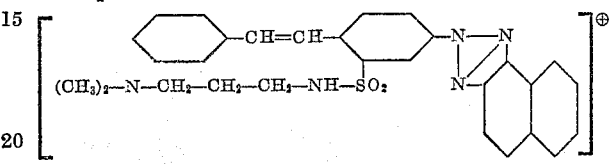

4. The method of optically brightening polymeric and copolymeric synthetic fibres consisting chiefly of polyacrylonitrile, which comprises treating said fibres in an aqueous solution containing a salt, the cation of which corresponds to the formula

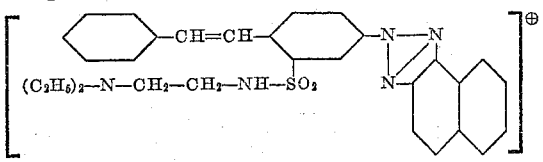

5. The method of optically brightening polymeric and copolymeric synthetic fibres consisting chiefly of polyacrylonitrile, which comprises treating said fibres in an aqueous solution containing a salt, the cation of which corresponds to the formula

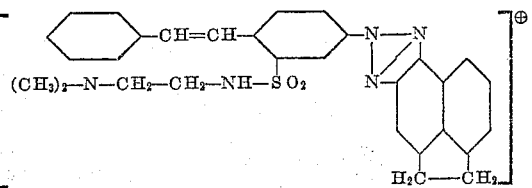

6. The method of optically brightening polymeric and copolymeric synthetic fibres consisting chiefly of polyacrylonitrile, which comprises treating said fibres in an aqueous solution containing a salt, the cation of which corresponds to the formula

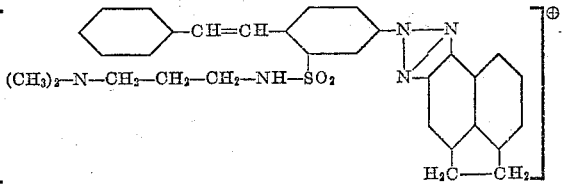

References Cited in the file of this patent

UNITED STATES PATENTS

| | | |
|---|---|---|
| 2,550,321 | Ackermann | Apr. 24, 1951 |
| 2,567,796 | Ackermann | Sept. 11, 1951 |
| 2,700,044 | Sartori | Jan. 18, 1955 |
| 2,713,057 | Zweidler et al. | July 12, 1955 |
| 2,784,184 | Zweidler | Mar. 5, 1957 |
| 2,809,123 | Keller et al. | Oct. 8, 1957 |
| 2,875,106 | Adams et al. | Feb. 24, 1959 |

FOREIGN PATENTS

| | | |
|---|---|---|
| 748,884 | Great Britain | May 16, 1956 |
| 555,303 | Canada | Apr. 1, 1958 |
| 200,143 | Austria | Oct. 25, 1958 |